United States Patent
Shah et al.

(10) Patent No.: US 11,324,070 B2
(45) Date of Patent: May 3, 2022

(54) METHOD OF AND APPARATUS FOR RELEASING MISSION CRITICAL DATA COMMUNICATION

(71) Applicant: Samsung Electronics Co., Ltd., Suwon-si (KR)

(72) Inventors: Sapan Pramodkumar Shah, Bangalore (IN); Basavaraj Jayawant Pattan, Bangalore (IN); Siva Prasad Gundur, Bangalore (IN); Suresh Chitturi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/345,936

(22) PCT Filed: Nov. 3, 2017

(86) PCT No.: PCT/KR2017/012434
§ 371 (c)(1),
(2) Date: Apr. 29, 2019

(87) PCT Pub. No.: WO2018/084648
PCT Pub. Date: May 11, 2018

(65) Prior Publication Data
US 2020/0068649 A1    Feb. 27, 2020

(30) Foreign Application Priority Data

Nov. 4, 2016   (IN) .............................. 201641037800
Oct. 27, 2017   (IN) .............................. 201641037800

(51) Int. Cl.
*H04W 76/30*    (2018.01)
*H04W 76/50*    (2018.01)

(52) U.S. Cl.
CPC .......... *H04W 76/30* (2018.02); *H04W 76/50* (2018.02)

(58) Field of Classification Search
CPC .............................. H04W 76/30; H04W 76/50
See application file for complete search history.

(56) References Cited

U.S. PATENT DOCUMENTS 10,142,808 B2 *   11/2018   Dong ...................... H04W 4/10
2008/0285462 A1    11/2008   Baker et al.
(Continued)

FOREIGN PATENT DOCUMENTS

EP      3 504 864 A1    7/2019
WO    2016/003157 A1    1/2016
(Continued)

OTHER PUBLICATIONS

'3GPP; TSGSSA, Feasibility study on mission critical data communications, (Release 14)', 3GPP TR 22.880 V14.0.0, pp. 37-44, Dec. 21, 2015.
(Continued)

*Primary Examiner* — Rhonda L Murphy
(74) *Attorney, Agent, or Firm* — Jefferson IP Law, LLP

(57) ABSTRACT

Disclosures herein provide methods and servers for releasing mission critical data (MCData) communication in a wireless communication system. The release of MCData communication is initiated by MCData UE by using the hyper text transfer protocol (HTTP) or the release of MCData communication is initiated by a MCData server with or without prior notification to the MCData UE.

11 Claims, 10 Drawing Sheets

(56) References Cited

U.S. PATENT DOCUMENTS

| | | | |
|---|---|---|---|
| 2009/0034702 A1* | 2/2009 | Cai | H04M 15/854 |
| | | | 379/114.2 |
| 2014/0297805 A1 | 10/2014 | Chaplot et al. | |
| 2015/0236822 A1* | 8/2015 | Pirskanen | H04W 72/044 |
| | | | 370/329 |
| 2016/0128060 A1 | 5/2016 | Azarian Yazdi et al. | |
| 2018/0359286 A1* | 12/2018 | Keller | H04W 68/005 |
| 2018/0368028 A1* | 12/2018 | Mufti | H04W 40/14 |

FOREIGN PATENT DOCUMENTS

| | | |
|---|---|---|
| WO | 2016/106593 A1 | 7/2016 |
| WO | 2018/048230 A1 | 3/2018 |

OTHER PUBLICATIONS

'3GPP; TSGSSA, Mission Critical Data services over Li E, (Release 14)', 3GPP TS 22 282 V14.1 0, pp. 13-17, Sep. 30, 2016.

Samsung, Pseudo-CR on MCData procedures—FD using media plane, 3GPP Draft, S6-161267_was_161247_161180_161094_Proceduresfd_Media_Plane, 3rd Generation Partnership Project (3GPP), Mobile Competence Centre, 50, Route Des Lucioiles, F-06921, (XP051172075), Oct. 10-14, 2016, Sophia Antipoiis, France.

Samsung, Pseudo-CR on MCData procedures - SDS session, 3GPP Draft, S6-161178_was_161092_Proceduressds_Session, 3rd Generation Partnership Project (3GPP), Mobile Compeience Centre, 650, Route Des Lucioles, F-06921, (XP051172000), Oct. 10-14, 2016, Sophia Antipoiis, France.

Samsung Electronics, Pseudo-CR on Communication release, 3GPP Draft, CI-172165 Communication Release, 3rd Generation Partnership Project (3GPP), Mobile Compeience Centre, 650, Route Des Lucioles, F-06921 Sophia-Antipolis Cedex, France D5 vol. CT WG1, No. Zhangjiajie, P.R of China; May 2017 (XP051270410).

3rd Generation Partnership Project, Technical Specification Group Services and System Aspects, Functional architecture and information flows to support Mission Critical Data (MCData), Stage 2 (Release 14), 3GPP Standard, 3GPP TS 23.282, 3rd Generation Partnership Project (3GPP), Mobile Competence Centre, 650 Route Des Lucioles, F-06921, vol. SA WG6, No. V0.1.0, Aug. 8, 2016, XP051172377, Sophia Antipoiis, France.

Partial Supplementary European Search Report dated Oct. 4, 2019, issued in European Patent Application No. 17867979.1.

Extended European Search Report dated Dec. 19, 2 019, issued in European Patent Application No. 17867979.1.

Chinese Office Action dated Jan. 14, 2021, issued in Chinese Patent Application No. 201780068244.5.

Korean Office Action dated Feb. 26, 2021, issued in Korean Patent Application No. 10-2019-7012823.

* cited by examiner

[Fig. 1A]
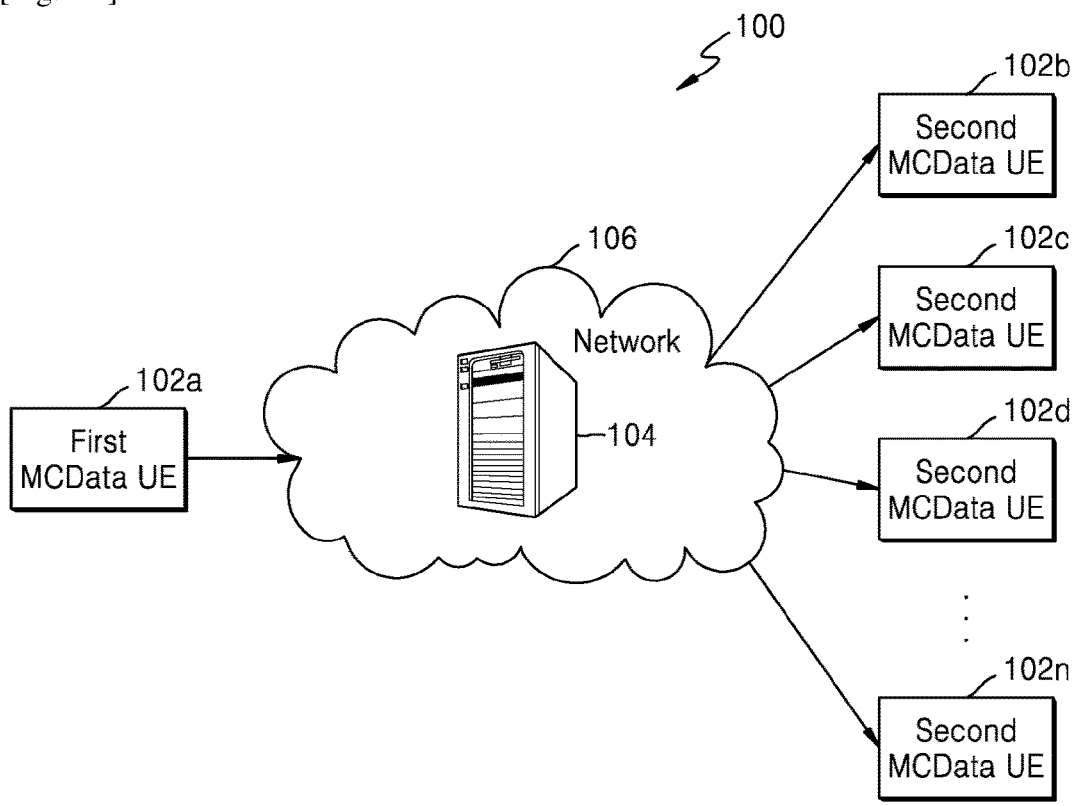
[Fig. 1B]
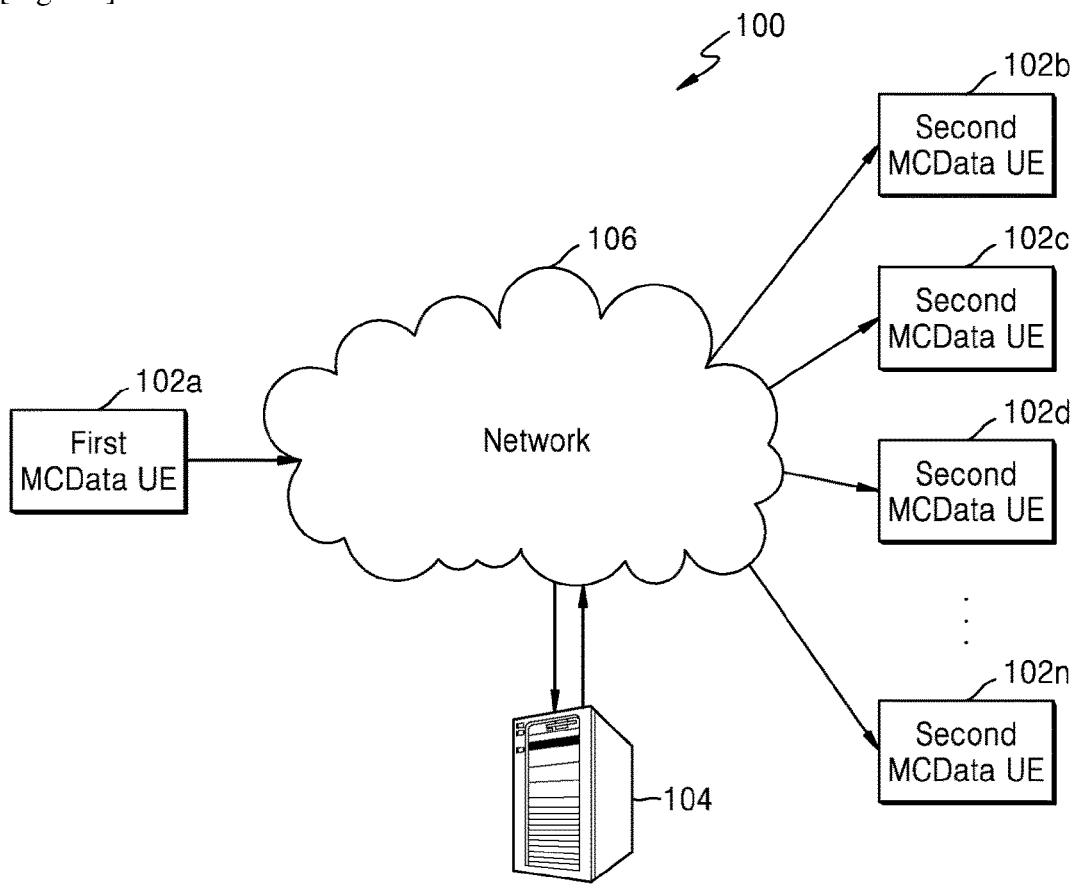

[Fig. 2]
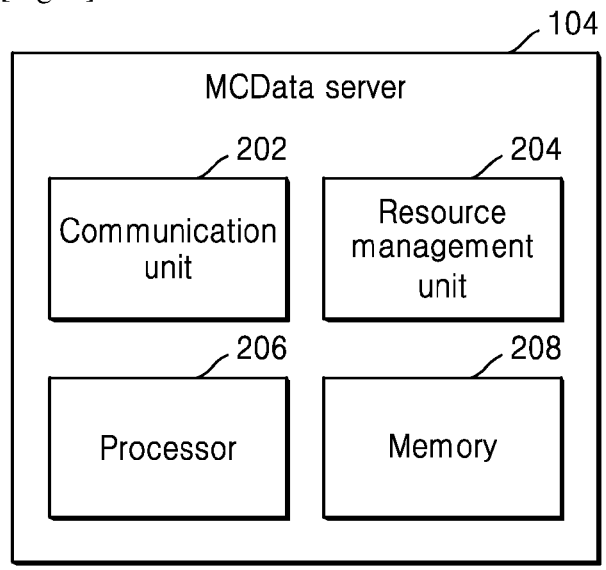
[Fig. 3]
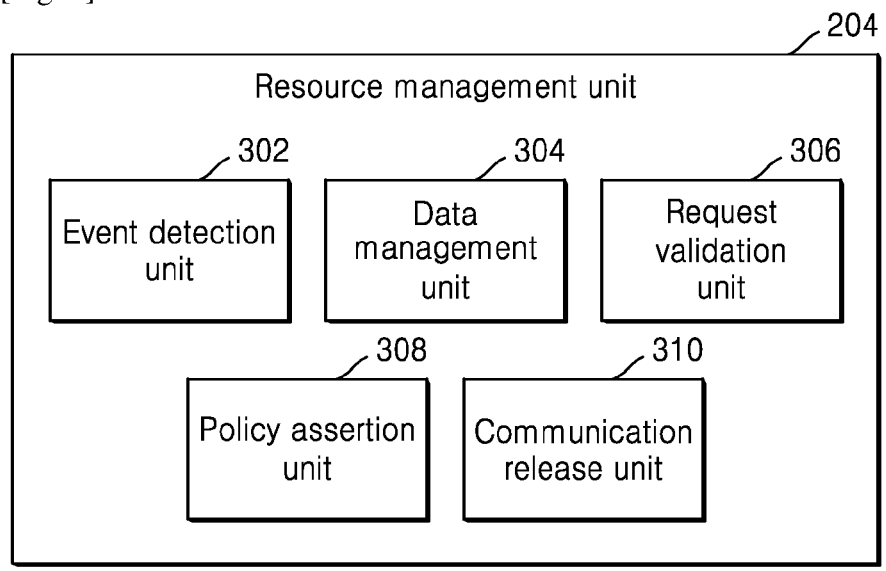

[Fig. 4A]
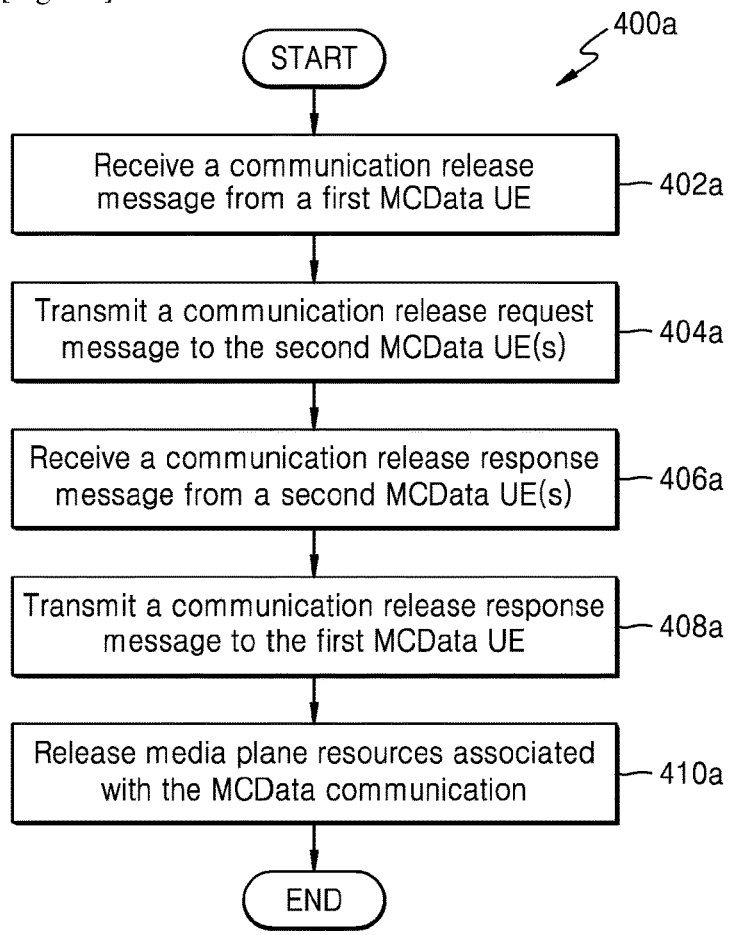
[Fig. 4B]
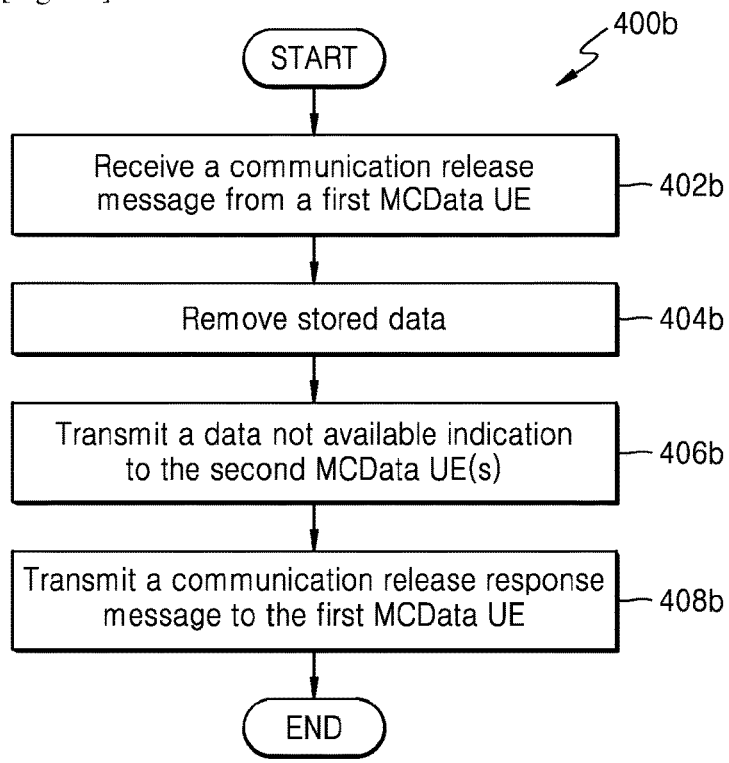

[Fig. 4C]
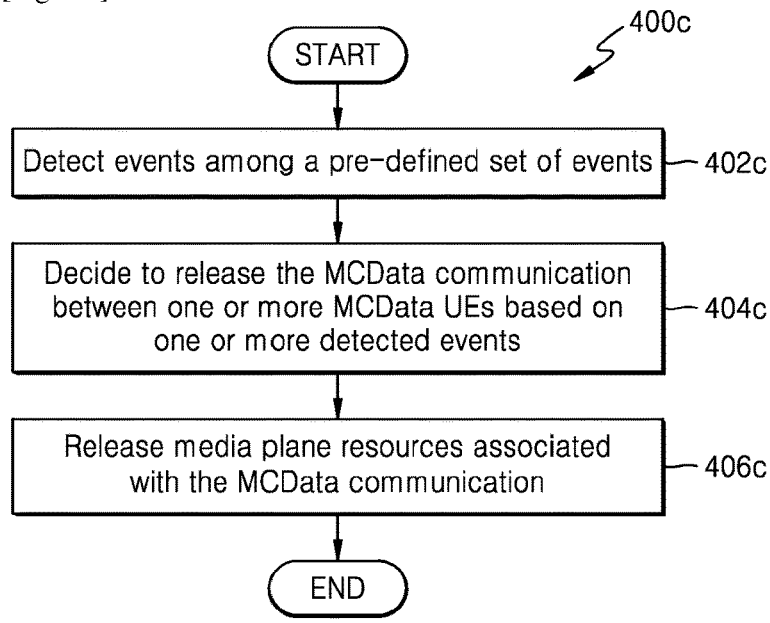
[Fig. 5]
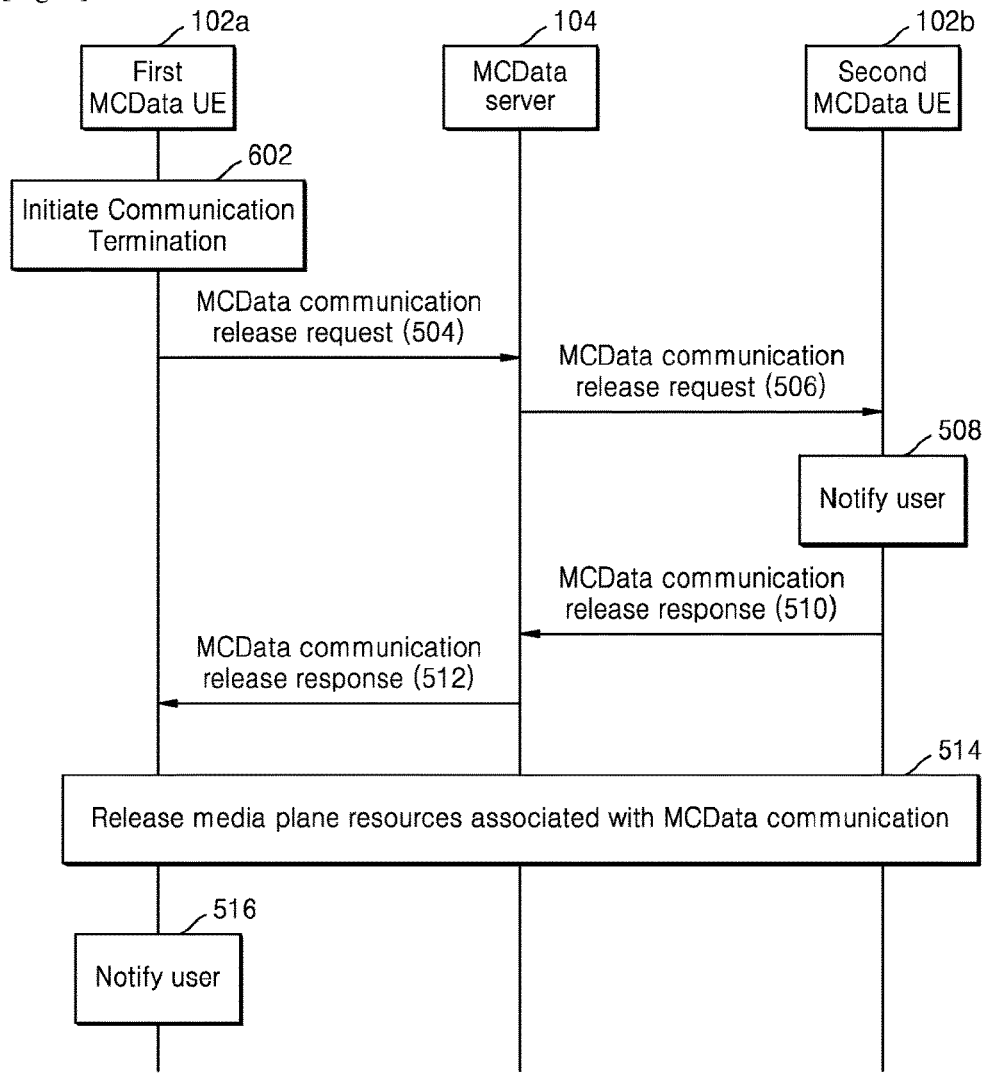

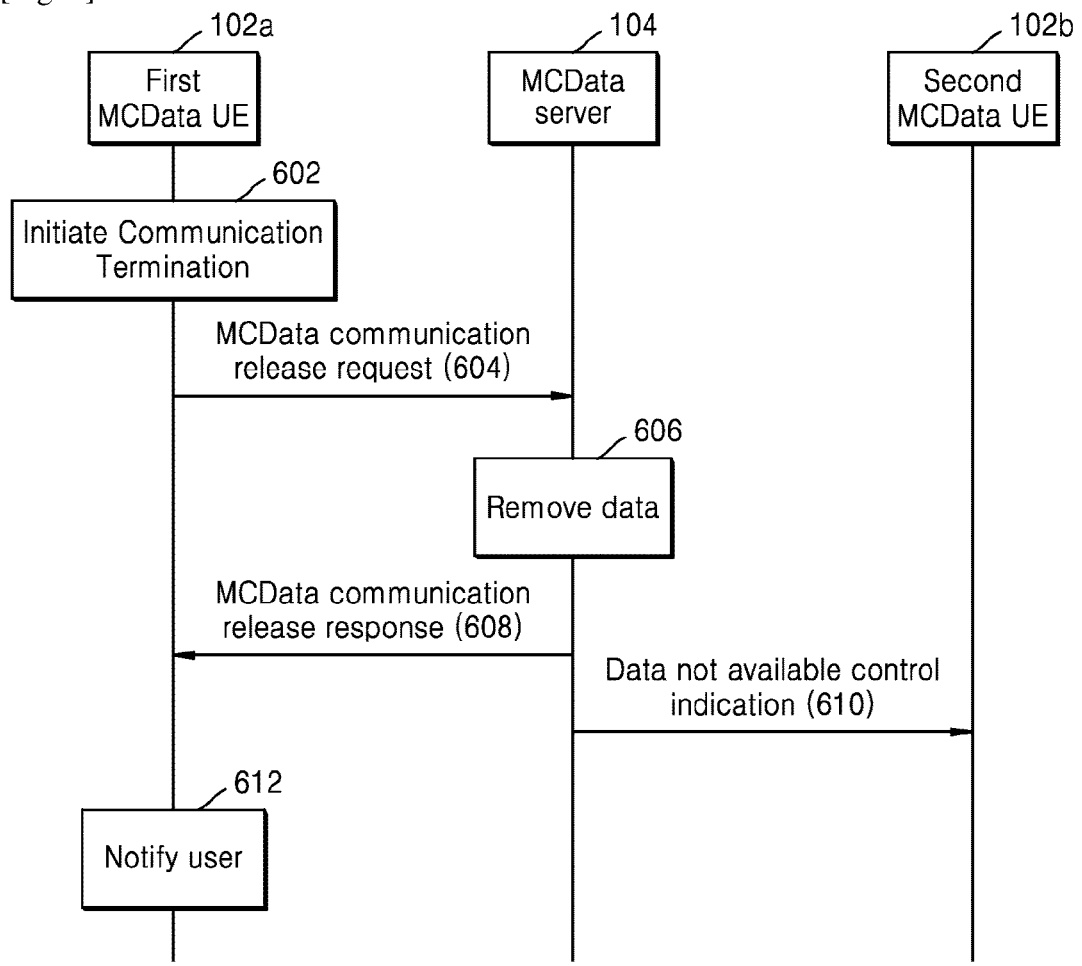
[Fig. 6]

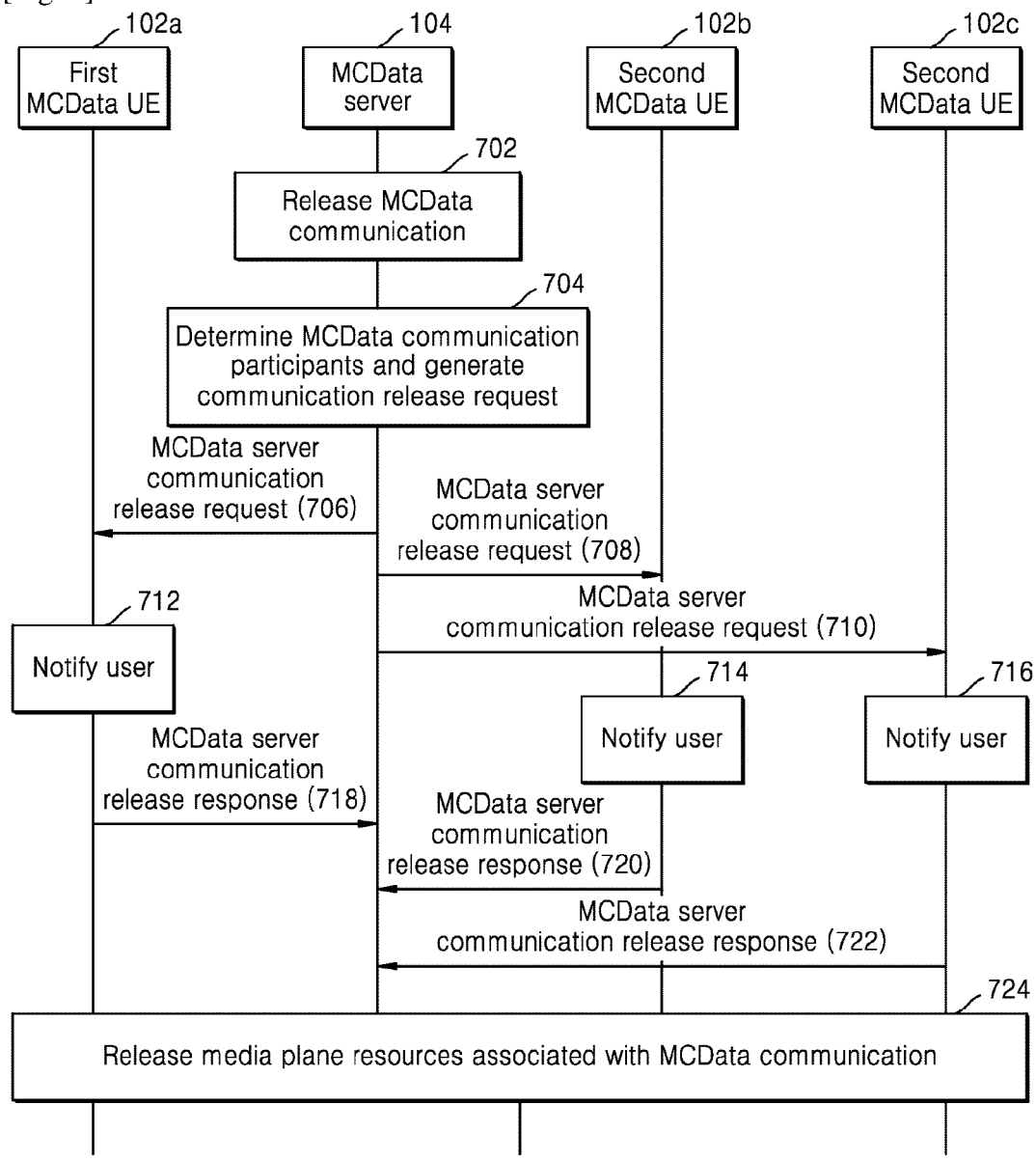

[Fig. 8]
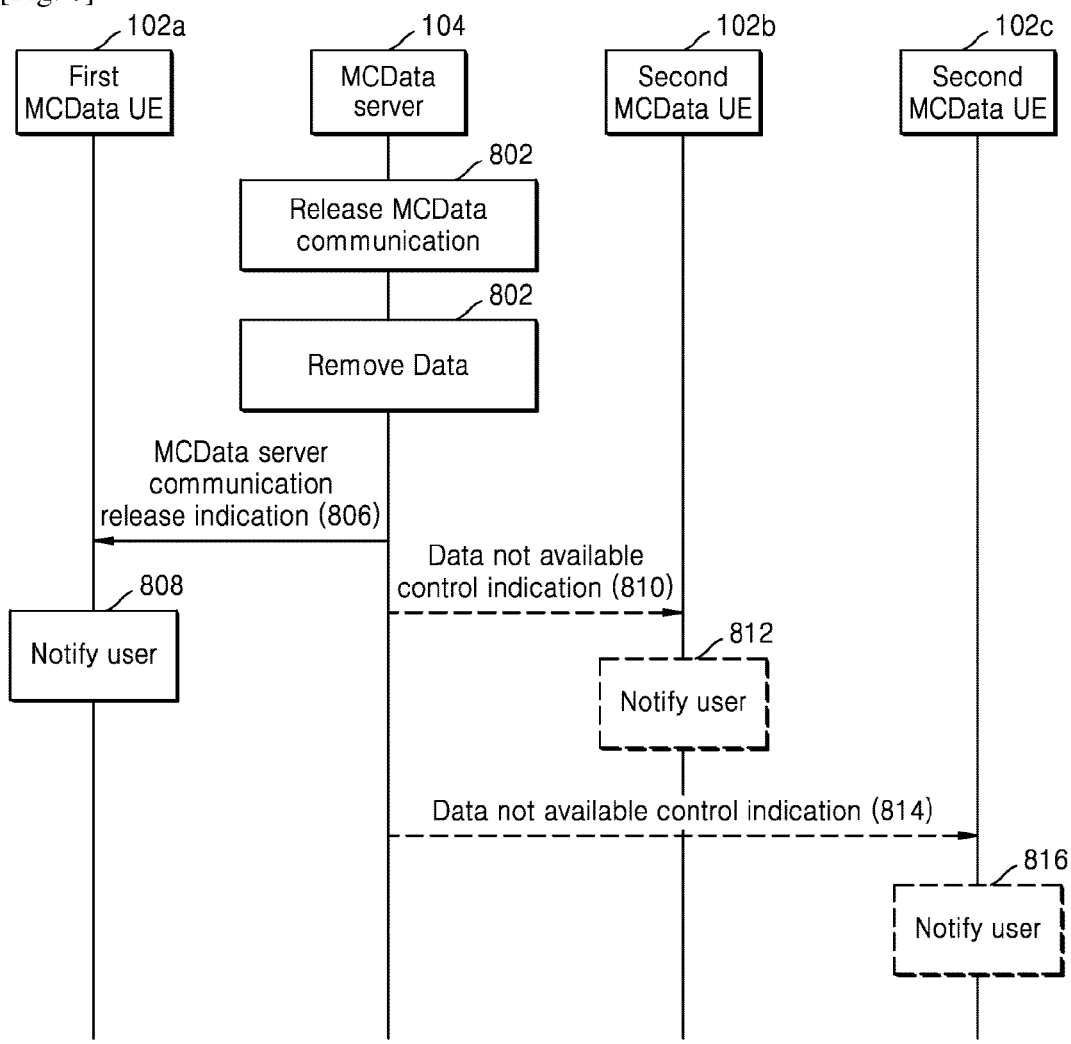

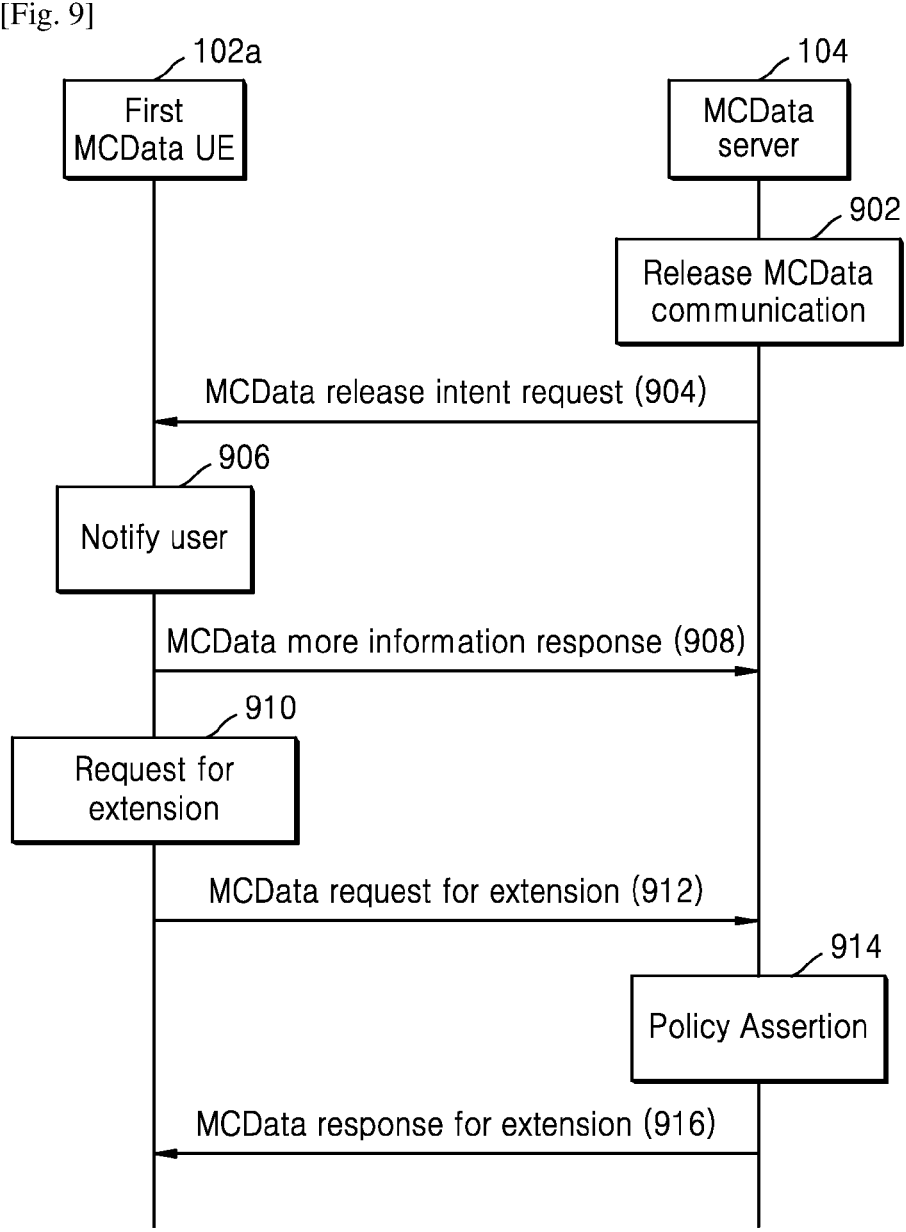

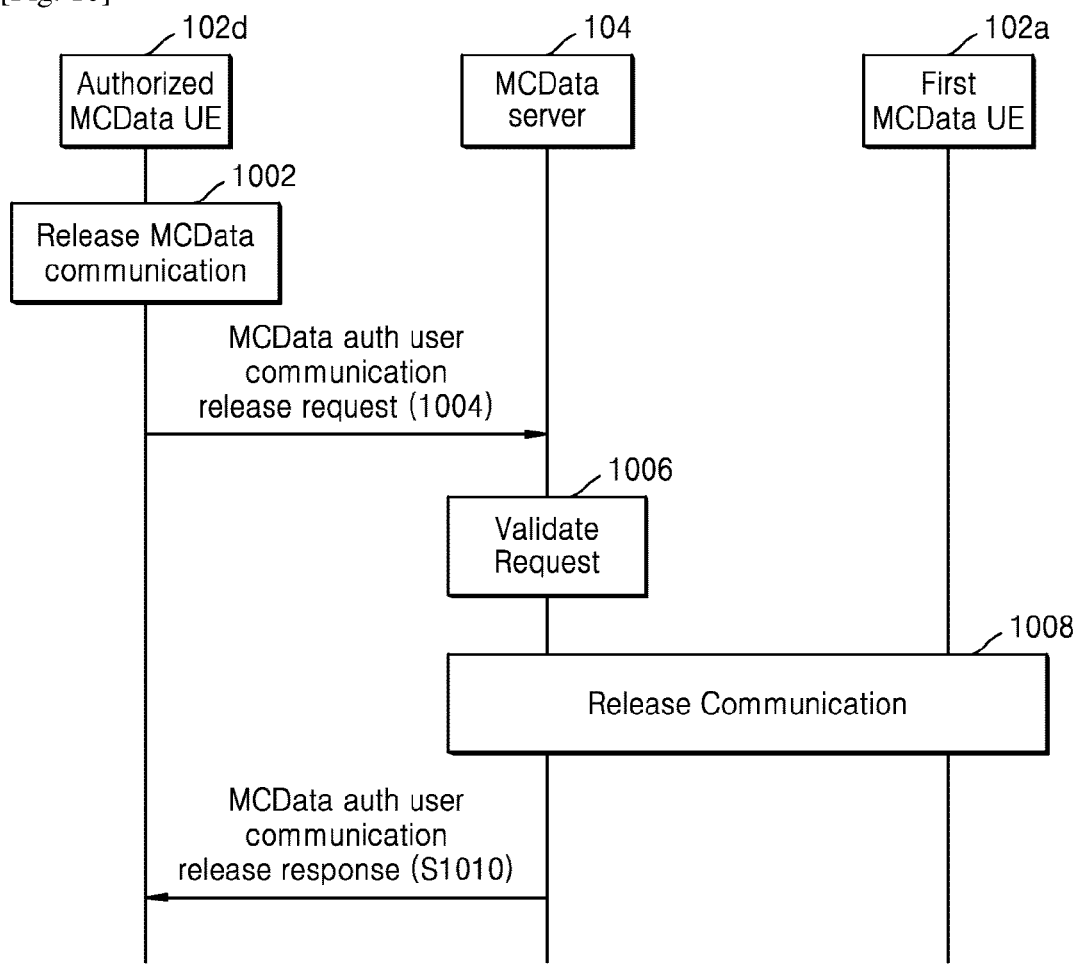

[Fig. 11]
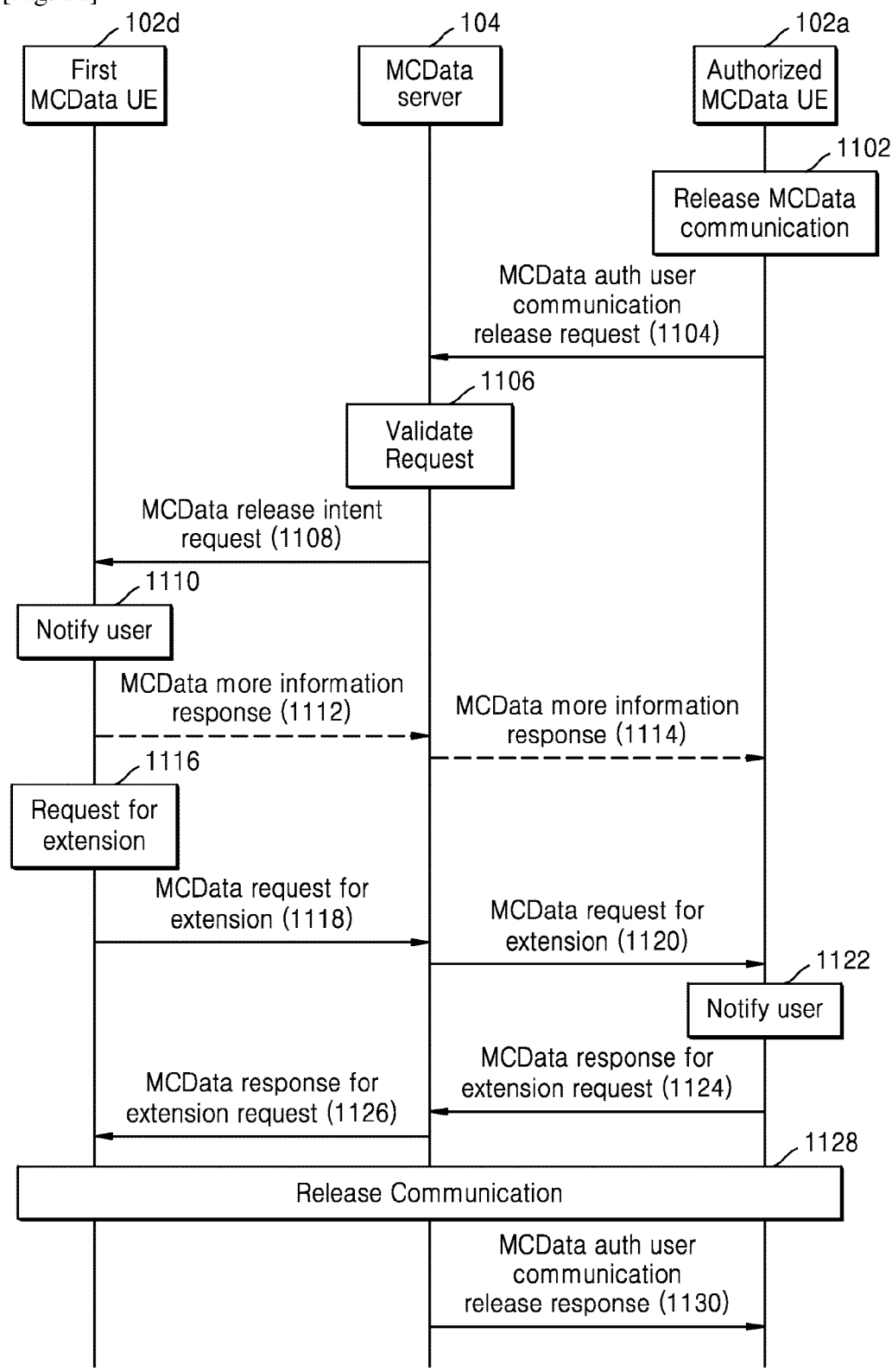

METHOD OF AND APPARATUS FOR RELEASING MISSION CRITICAL DATA COMMUNICATION

TECHNICAL FIELD

The disclosures herein generally relate to wireless communication systems, and more particularly, to mission critical data (MCData) communication in wireless communication systems.

BACKGROUND ART

Public safety networks are used for Mission Critical (MC) Data/voice/video communications. MCData communication may include a defined set of MCData services. Such MCData services typically build on the existing third generation partnership project (3GPP) transport communication mechanisms provided by the evolved packet system (EPS) architectures to establish, maintain, and terminate the actual communication path(s) among users. Typically, a MCData server provides centralized support for such MCData services. The MCData server may further facilitate or govern MCData communication among various users of the network.

In an operational situation, a large number of users may need to avail MC communication services at the same time. Thus, the MCData server must allocate resources to cater to the needs of the users. However, resources are most often limited. Due to the nature of the communications, there is a need to efficiently manage resources involved in MCData communication.

The above information is presented as background information only to help the reader to understand the present invention. Applicants have made no determination and make no assertion as to whether any of the above might be applicable as Prior Art with regard to the present application.

DISCLOSURE OF INVENTION

Solution to Problem

Provided a method of releasing mission critical data (MCData) communication in a wireless communication systems, the method comprising receiving a communication release message from first MCData user equipment when the first MCData UE is in communication with one or more second MCData UEs, transmitting a communication release request message to the one or more second MCData UEs, receiving a communication release response message from the one or more second MCData UEs, transmitting a communication release response message to the first MCData, and releasing media plane resources associated with the MCData communication.

Advantageous Effects of Invention

The present disclosure enables a large number of users to avail MC communication services at the same time. Thus, the MCData server can allocate resources effectively to cater to the needs of the users.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIGS. 1A and 1B illustrate an example mission critical (MC) communication system 100 for releasing MCData communication, according to an embodiment as disclosed herein;

FIG. 2 illustrates various units of a MCData server for releasing MCData communication, according to an embodiment as disclosed herein;

FIG. 3 illustrates various units of a resource management unit of the MCData server, according to an embodiment as disclosed herein;

FIG. 4A is a flow diagram illustrating a method of releasing MCData communication based on use of a media plane by the MCData server in response to a request received from first MCData UE (i.e., initiator of the MCData communication), according to an embodiment as disclosed herein;

FIG. 4B is a flow diagram illustrating a method of releasing MCData communication based on use of the HTTP by the MCData server in response to a request received from first MCData UE (i.e., initiator of the MCData communication), according to an embodiment as disclosed herein;

FIG. 4C is a flow diagram illustrating a method of releasing MCData communication based on one or more events detected by the MCData server, according to an embodiment as disclosed herein;

FIG. 5 is a sequence diagram illustrating various signaling messages exchanged among the first MCData UE, the MCData server, and second MCData UE and according to which the first MCData UE initiates release of the MCData communication using a media plane, according to an embodiment as disclosed herein;

FIG. 6 is another sequence diagram illustrating various signaling messages exchanged between the first MCData UE, the MCData server, and the second MCData UE and according to which first MCData UE initiates release of the MCData communication using the HTTP, according to an embodiment as disclosed herein;

FIG. 7 is a sequence diagram illustrating various signaling messages exchanged among the first MCData client UE, the MCData server, and the second MCData UE and according to which the MCData server initiates release of the MCData communication without prior notification and by using the media plane, according to an embodiment as disclosed herein;

FIG. 8 is another sequence diagram illustrating various signaling messages exchanged among the first MCData UE, the MCData server, and the second MCData UE and according to which the MCData server initiates release of the MCData communication without prior notification and using HTTP, according to an embodiment as disclosed herein;

FIG. 9 is a sequence diagram illustrating various signaling messages exchanged between the first MCData UE and the MCData server and according to which the MCData server initiates communication termination with prior notification to the first MCData UE, according to an embodiment as disclosed herein;

FIG. 10 is a sequence diagram illustrating various signaling messages according to which authorized MCData UE initiates release of MCData communication without prior notification to the first MCData UE, according to an embodiment as disclosed herein; and FIG. 11 is a sequence diagram illustrating various signaling messages according to which the authorized MCData UE initiates release of the MCData communication with prior notification to the first MCData UE, according to an embodiment as disclosed herein.

BEST MODE FOR CARRYING OUT THE INVENTION

The principal object of the embodiments herein is to provide a method of releasing resources in Mission Critical (MC) Data communication.

Another object of the embodiments herein is to provide a method of releasing MCData communication using a media plane, the MCData communication being initiated by MCData user equipment (UE).

Another object of the embodiments herein is to provide a method of releasing MCData communication using the Hyper Text Transfer Protocol (HTTP), the MCData communication being initiated by MCData UE.

Another object of the embodiments herein is to provide a method of releasing MCData communication initiated by a MCData server.

Another object of the embodiments herein is to provide a method of releasing resources for MCData communication with prior notification to one or more MCData UEs.

Another object of the embodiments herein is to provide a method of releasing resources for MCData communication without prior notification to the one or more MCData UEs.

Another object of the embodiments herein is to provide a method of releasing MCData communication initiated by authorized MCData UE.

MODE FOR THE INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

Also, the various embodiments described herein are not necessarily mutually exclusive, as some embodiments may be combined with one or more other embodiments to form new embodiments. Herein, the term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "first" and "second" herein are used merely for labeling purpose and may be used interchangeably without departing from the scope of the embodiments.

Accordingly the embodiments herein provide a method of releasing MCData communication in a wireless communication system. The method includes receiving, by the MCData server, a communication release message from first MCData UE when the first MCData UE is in communication with one or more second MCData UEs. Further, the method includes transmitting, by the MCData server, a communication release request message to the one or more second MCData UE(s). Further, the method includes receiving, by the MCData server, a communication release response message from the one or more second MCData UE(s). Further, the method includes transmitting, by the MCData server, a communication release response message to the first MCData UE. Furthermore, the method includes releasing, by the MCData server, media plane resources associated with the MCData communication.

The proposed method provides support for release of MCData communication for MCData services. According to the proposed method, the MCData communication may be released based on the communication release message received from an initiator of the MCData communication (i.e., the first MCData UE).

In various embodiments, the method includes detecting, by a MCData server, events according to a pre-defined set of criteria/policy. Further, the method includes deciding, by the MCData server, to release the MCData communication based on the one or more detected events. Furthermore, the method includes releasing, by the MCData server, media plane resources associated with the data communication. For example, the events may include lack of capacity, limits for the maximum amount of data, a time interval for which the MCData UE transmits in response to a single request to transmit, or the like. Further, the proposed method includes procedures including supporting communication release with/without prior notification to the one or more second MCData UEs. The proposed method may be used to efficiently manage resources in the MCData communication by releasing the resources based on the detected events.

In an embodiment, the Hyper Transfer Text Protocol (HTTP) is used as a communication transport protocol for MCData communication.

In various embodiments, the release of connection is initiated by one of the plurality of the MCData UE. In some embodiments, where the first MC UE initiates release of connection, the MCData UE transmits a communication release message to the MCData server. Further, the MCData UE receives a communication release response message from the MCData server. After transmitting the communication release response to the MCData UE, the MCData server releases the media plane resources associated with the MCData communication.

In various embodiments, the release of connection is initiated by the MCData server. In some embodiments, where the MCData server initiates release of connection, the MCData server detects events according to a pre-defined set of criteria/policy, such as for example, lack of capacity, limits for the maximum amount of data, a time interval for which the MCData UE transmits in response to a single request to transmit, or the like. The MCData server releases the MCData communication based on the detected events at the MCData server.

In some embodiments, the MCData server transmits a communication release request message to each of the one or more second MCData UEs. Further, the MCData server receives a communication release response message from each of the one or more second MCData UEs for releasing media plane resources associated with the MC communication.

In some embodiments, prior to releasing the resources of the MCData communication, the MCData server removes data received from the MCData UE, which has initiated the release of the MCData communication. Further, the MCData server transmits a control indication message indicating that the data is unavailable to the one or more second MCData UEs.

In some embodiments, the MCData server transmits the communication release request message to each of the one or more second MCData UEs without prior notification to the each of the one or more second MCData UEs for releasing the MCData connection.

In some embodiments, the MCData server transmits a release intent request message to one of the plurality of the MCData UEs (i.e., to inform the MCData UE about release of connection, with prior notification). The release intent request message includes a request message for obtaining more information from the MCData UE. Further, the MCData server receives a response message containing more information in response to the release intent request message from the MCData UE. Furthermore, the MCData server waits for a pre-determined time interval to receive a request for extension from the MCData UE. The MCData server releases media plane resources associated with the MCData communication in absence of the request for extension from the MCData UE within the pre-determined time interval. In some embodiments, the MCData server decides to accept the request for extension or reject the request for extension request based on one or more policies after receiving the request for extension from the first MCData UE.

In various embodiments, release of MCData communication is initiated by authorized MCData UE. In some embodiments, the authorized MCData UE initiates release of MCData communication without prior notification to the MCData UE. The MCData server receives a communication release request message received from the authorized MCData UE. The MCData server validates the communication release request message received from the authorized MCData UE. Further, the MCData server releases the media plane resources associated with the MCData communication.

In some embodiments, the authorized MCData UE initiates release of MCData communication with prior notification to the MCData UE. The MCData server receives a communication release request message from the authorized MCData UE. The MCData server transmits a release intent request message (which indicates the prior notification to the MCData UE) to the MCData after validating the communication release request message received from the authorized MCData UE. The release intent request message includes a request message for obtaining more information. Further, the MCData server receives a response message containing more information in response to the release intent request message from the first MCData UE. Further, the MCData server transmits the response message containing more information to the authorized MCData UE. The MCData server waits for a pre-determined time interval to receive a request for extension message from the MCData UE, wherein the MCData server releases media plane resources associated with the MCData communication in absence of the request for extension within the pre-determined time interval. If the MCData server receives the request for extension message from the MCData UE, the MCData server transmits the request for extension message to the authorized MCData UE. Further, the MCData server receives a response for extension from the authorized MCData UE and transmits the response for extension to the MCData UE. Furthermore, the MCData server releases the MCData connection after transmitting the response for extension to the MCData UE.

Referring now to the drawings, and more particularly to FIGS. 1 through 11, there are shown preferred embodiments.

FIGS. 1A and 1B illustrate an example MC communication system 100 for releasing MCData communication, according to an embodiment. As depicted in FIG. 1A, the MC communication system 100 includes first MCData UE 102a, a plurality of second MCData UEs, namely, 102b, 102c, 102d, ..., 102n, and a MCData server 104 in a network 106. The MCData server 104 may serve as a centralized server to enable the network 106 to provide a MCData service to the MCData UEs 102a, 102b, 102c, 102d, ..., 102n. In some examples, elements of the network 106 may include 3GPP E-UTRAN access elements (not shown) and 3GPP E-UTRAN core elements (not shown). For example, the first MCData UE 102a may gain access to the network 106 through an LTE-Uu interface (not shown) through an evolved Node B (eNB, not shown). Further, the MCData server 104 may be coupled to various access/core elements. For example, the MCData server 104 may be coupled to a serving gateway/packet data gateway through one or more suitable interface reference points. Various core elements such as mobile management entity (MME) and multimedia broadcast/multicast service gateway (MBMS GW) may provide core 3GPP E-UTRAN services to the MCData server 104 and/or the MCData UEs 102a, 102b, 102c, 102d, ..., 102n to facilitate the providing of MCData communication services by the network 106. In an embodiment, the MCData server 104 may be external to the network 106 as shown in FIG. 1B. One or more elements of the network 106 communicate with the MCData server 104 for providing MCData communication services to the MCData UEs 102a, 102b, 102c, 102d, ..., 102n. In some embodiments, the MCData server may be present in a secure environment for providing MCData communication services.

In an embodiment, each of the first MCData UE 102a and the second MCData UEs 102b to 102n may be, e.g., an electronic device, User Equipment (UE), or the like. Each of the first MCData UE 102a and the second MCData UEs 102b to 102n may include a MCData client (i.e., an application) for communicating with the MCData server 104. The first MCData UE 102a may include a first MCData client, the second MCData UE 102b may include a second MCData client, and so on.

The MCData client in each of the MCData UE acts as user agent for all MCData application transactions. The MCData client supports SDS, file distribution, data streaming and IP connectivity MCData capabilities utilized by MCData services like conversation management, robots control, enhanced status, database enquiries and secured internet.

The MCData server 104 provides centralized support for MCData services suite. Conversation management, robots, enhanced status, database enquiries and secured internet MCData services requiring one-to-one or group data communication are realized using SDS, file distribution, data streaming and Internet Protocol (IP) connectivity MCData communication capabilities. All the MCData clients supporting users belonging to a single group are required to use the same MCData server 104 for that group. In an embodiment, HTTP is used as the communication transport protocol for MCData communication.

Referring to the FIG. 1A, the MCData server 104 is configured to receive a communication release request message from the first MCData UE 102a when the first MCData UE 102a is in communication with one or more second MCData UEs 102b-102n. The MCData server 104 is configured to transmit a communication release message to the first MCData UE 102a. Further, the MCData server 104 is configured to transmit the communication release message to the one or more second MCData UEs 102b-102n. After transmitting the communication release message to the one or more second MCData UEs 102b-102n, the MCData server 104 releases the media plane resources associated with the MCData communication.

In an embodiment, the MCData server 104 detects events according to a pre-defined set of criteria/policy. The events include but are not limited to lack of capacity, limit for the maximum amount of data or time that the first MCData UE 102a transmits in response to a single request to transmit exceeded or the like. The MCData server 104 decides to release the MCData communication to the one or more second MCData UEs based on the one or more detected events. Further, the M data server 104 releases the media plane resources associated with the communication. The various operations involved in releasing of the MCData communication by the MCData server 104 are described in conjunction with figures in the later parts of the description.

FIG. 2 illustrates various units of the MCData server 104 for release of MCData communication, according to an embodiment as disclosed herein. As depicted in the FIG. 2, the MCData server 104 includes a communication unit 202, a resource management unit 204, a processor 206 and a memory 208.

The communication unit 202 may be configured to send or receive more signaling messages from the first MCData UE 102a and the one or more second MCData UE s 102b-102n. Further, the communication unit 202 may be configured to transmit one or more signaling messages to inform the first MCData UE 102a and the one or more second MCData UE s 102b-102n about the release of MCData communication. The one or more signaling messages may be transmitted to the first MCData UE 102a and the one or more second MCData UE s 102b-102n for release of MCData communication.

In an embodiment, the communication 202 unit may be configured to receive a communication release request message from the first MCData UE 102a. Further, the communication unit 202 may be configured to transmit the communication release request message to the one or more second MCData UEs 102b-102n. The communication unit may be further configured to receive communication release response message from the one or more second MCData UEs 102b-102n.

The resource management unit 204 may be configured to manage resources of the MCData communication. In an embodiment, the resource management unit 204 may be configured to release the resources of the MCData communication based on occurrence of the one or more events such as one or more policies, network load conditions and so on. The resource management unit 204 may include various units for managing the resources of the MCData communication. The functionality of the various units 204 for release of the MCData communication are described in conjunction with FIG. 3.

The processor 206 (e.g., a hardware unit, an apparatus, a Central Processing Unit (CPU), a Graphics Processing Unit (GPU), etc.) communicatively coupled to the memory 208 (e.g., a volatile memory and/or a non-volatile memory); the memory 208 includes storage locations configured to be addressable through the processor 206.

The memory 208 stores the data received from the first MCData UE 102a and the one or more second MCData UEs 102b-102n during the MCData communication. In an embodiment, the memory 208 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 208 may, in some examples, be a non-transitory storage medium. The term "non-transitory" may indicate that the storage medium is not embodied in a carrier wave or a propagated signal. However, the term "non-transitory" should not be interpreted that the memory 208 is non-movable. In some examples, the memory 208 may be configured to store larger amounts of information than its capacity. In certain examples, a non-transitory storage medium may store data that can, over time, change (e.g., in Random Access Memory (RAM) or cache).

FIG. 3 illustrates various units of the resource management unit 204 of the MCData server 104, according to an embodiment as disclosed herein. As depicted in FIG. 3, the resource management unit 204 includes an event detection unit 302, data management unit 304, request validation unit 306, policy assertion unit 308 and communication release unit 310.

The event detection unit 302 may be configured to detect the occurrence of the events according to a pre-defined set of criteria/policy. For example, the events may include lack of capacity, limits for the maximum amount of data, a time interval for which the MCData UE transmits in response to a single request to transmit, or the like. The one or more events may be configured by an MCData administrator based on requirements for efficiently managing the resources of the MCData communication.

In an embodiment, the data management unit 304 may be configured to remove the data intended to the one or more second MCData UEs 102b-102n in response to the communication release request message received from the first MCData UE 102a. After removing the data intended to the one or more second MCData UEs 102b-102n, the data management unit 304 may be configured to transmit a data not available indication message to the one or more second MCData UEs 102b-102n.

The request validation unit 306 may be configured to validate the communication release request received from the first MCData UE 102a for release of the MCData communication. The communication release request message is validated to determine whether authorized MCData UE is requesting the release of the MCData communication.

The request validation unit 306 may use one or more validation schemes for authorizing the first MCData UE 102a.

The policy assertion unit 308 may be configured to assert or determine the one or more policies for the MCData communication between the first MCData UE 102a and the one or more second MCData UEs 102b-102n. Based on the policies for the MCData communication, the MCData server may accept the request for extension of time or reject the request for extension of time for MCData communication.

The communication release unit 310 may be configured to release the media plane resources associated with the MCData communication. The communication release unit 310 may be configured to receive indication from the event detection unit 302, data management unit 304, request validation unit 306 and policy assertion unit 308 for releasing the media plane resources associated with the MCData communication.

In an embodiment, the communication release unit 310 may be configured to wait for a pre-determined time interval to receive a request for extension (for time) from the first MCData UE 102a before releasing the MCData communication. The predetermined time interval may be set by the MCData administrator. If the MCData server 104 does not receive any user request for extension, then after expiry of the predetermined time interval, the MCData server 104 releases the MCData communication.

FIG. 4A is a flow diagram 400a illustrating a method of releasing the MCData communication using media plane by the MCData server 104 based on a request received from the first MCData UE 102a (i.e., initiator of the MCData communication), according to an embodiment as disclosed herein.

In operation 402a, the method includes receiving the communication release message from the first MCData UE 102a. The method allows the communication unit 202 to receive the communication release message from the first MCData UE 102a.

In operation 404a, the method includes transmitting the communication release request message to the one or more second MCData UEs 102b-102n. The method allows the communication unit 202 to transmit the communication release request message to the one or more second MCData UEs 102b-102n.

In operation 406a, the method includes receiving the communication release response message from the one or more second MCData UEs 102b-102n. The method allows the communication unit 202 to receive the communication release response message from the one or more second MCData UEs 102b-102n.

In operation 408a, the method includes transmitting the communication release response message to the first MCData UE 102a. The method allows the communication unit 202 to transmit the communication release response message to the first MCData UE 102a.

In operation 410a, the method includes releasing the media plane resources associated with the MCData communication. The method allows the resource management unit 204 to release the media plane resources associated with the MCData communication.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the invention.

FIG. 4B is a flow diagram 400b illustrating a method of releasing the MCData communication using HTTP by the MCData server 104 based on a request received from the first MCData UE 102a (i.e., initiator of the MCData communication), according to an embodiment as disclosed herein.

In operation 402b, the method includes receiving the communication release message from the first MCData UE 102a. The method allows the communication unit 202 to receive the communication release message from the first MCData UE 102a.

In operation 404b, the method includes removing the data intended to the one or more second MCData UEs 102b-102n. The method allows the data management unit 304 to remove the data intended to the one or more second MCData UEs 102b-102n.

In operation 406b, the method includes transmitting a data not available indication message to the one or more second MCData UEs 102b-102n. The method allows the data management unit 304 to remove the data intended to the one or more second MCData UEs 102b-102n.

In operation 408b, the method includes transmitting the communication release response message to the first MCData UE 102a. The method allows the communication unit 202 to transmit the communication release response message to the first MCData UE 102a.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the invention.

FIG. 4C is a flow diagram 400c illustrating a method of releasing MCData communication based on one or more events detected by the MCData server 104, according to an embodiment as disclosed herein;

In operation 402c, the method includes detecting the events among a pre-defined set of events. The method allows the resource management unit 204 to detect the events among a pre-defined set of events. For example, the events may include lack of capacity, limits for the maximum amount of data, a time interval for which the MCData UE transmits in response to a single request to transmit, or the like.

In operation 404c, the method includes deciding to release the MCData communication to one or more MCData UEs based on one or more detected events. The method allows the resource management unit 204 to decide to release the MCData communication to one or more MCData UEs based on one or more detected events.

In operation 406c, the method includes releasing the media plane resources associated with the MCData communication. The method allows the resource management unit 204 to release the media plane resources associated with the MCData communication. In some embodiments, the resource management unit 204 is configured to release the media plane resources associated with the MCData communication with prior notification by transmitting the release intent request message to the initiator of the MCData UE (i.e., the first MCData UE 102a). In some embodiments, the resource management unit 204 is configured to release the media plane resources associated with the MCData communication without prior notification. During release of MCData communication without prior notification, the MCData server 104 transmits the communication release request message to the first MCData UE 102*a* and the one or more second MCData UEs 102*b*, 102*c*, 102*d* and so on to 102*n*.

The various actions, acts, blocks, operations, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a sequence diagram illustrating various signaling messages transmitted between the first MCData UE 102*a*, the MCData server 104, and the second MCData UE 102*b* so that the first MCData UE 102*a* initiates release of MCData communication using media plane, according to an embodiment as disclosed herein. The sequence diagram in FIG. 5 describes the procedure for the first MCData UE 102*a* to initiate MCData communication release where the MCData communication is established as Short Data Service (SDS) using media plane or SDS session or file distribution using media plane. The procedure describes signalling control plane procedure for the case where the MCData communication is ongoing and the first MCData UE 102*a* (i.e., transmitting participant) initiates the MCData communication release. The procedure is applicable to one-to-one communication and group MCData communications.

Initially, the users of the first MCData UE 102*a* and the second MCData UE 102*b* are registered for receiving MCData service. The MCData communication is established between the first MCData UE 102*a* and the second MCData UE 102*b* and the first MCData UE 102*a* is the initiator of the MCData communication.

During the MCData communication, the first MCData UE 102*a* (i.e., the transmitting participant) may at any time indicate to the MCData server 104 that the first MCData UE 102*a* (the transmitting participant) no longer wants to transmit the MCData to the one or more second MCData UEs 102*b*-102*n*. This results in release of the MCData communication. The procedure for releasing the MCData communication is as described below.

1. The user of the first MCData UE 102*a* initiates (502) MCData communication release.

2. The first MCData UE 102*a* sends (504) MCData communication release request to the MCData server 104, for interrupting the communication with the one or more second MCData UEs 102*b*-102*n*. MCData communication release request includes an identity of the MCData user of the first MCData UE 102*a* for uploading data and the identity to the second MCData UE 102*b* on which the communication is to be released.

3. The MCData server 104 transmits the MCData communication release request to the one or more second MCData UEs 102*b*-102*n*.

4. The one or more second MCData UEs 102*b*-102*n* notifies (508) respective MCData users about the release of MCData communication.

5. The one or more second MCData UEs 102*b*-102*n* receiving the MCData communication release request transmit (510) MCData communication release response to the MCData server 104.

6. The MCData server 104 sends (512) MCData communication release response to the first MCData UE 102*a*. The MCData communication release response includes the identity of the MCData user of the first MCData UE 102*a* requesting to upload data, an identity of the second MCData UE 102*b* on which the communication is released and confirmation whether MCData communication is released or not.

7. The MCData UEs 102*a*-102*n* of the MCData communication have successfully released (514) the media plane resources associated with the MCData communication that is released.

8. The first MCData UE 102*a* notifies (516) the MCData user about the release of the MCData communication.

FIG. 6 is another sequence diagram illustrating various signaling messages communicated between the first MCData UE 102*a*, the MCData server 104, and the second MCData UE 102*b*, in which first MCData UE 102*a* initiates the release of MCData communication using HTTP, according to an embodiment as disclosed herein. The sequence diagram in FIG. 6 describes the procedure for first MCData UE 102*a* initiated MCData communication release where MCData communication is established with procedures for file distribution using HTTP. The procedure in FIG. 6 describes signaling control plane procedure for the case where the MCData communication is ongoing and the first MCData UE 102*a* (i.e., the transmitting participant) initiates MCData communication release. The procedure is applicable to one-to-one and one-to-many MCData communications.

Initially, the users of first MCData UE 102*a* and the second MCData UE 102*b* are registered for receiving MCData service through respective MCData clients. The first MCData UE 102*a* is transmitting a file to the second MCData UEs 102*b*-102*n*. The procedure for releasing the MCData communication is as described below.

1. The user of the first MCData UE 102*a* initiates (602) termination of MCData communication.

2. The first MCData UE 102*a* sends (604) MCData communication release request to the MCData server 104 for identifying the HTTP file transmission. The MCData communication release request includes an identity of the MCData user of first MCData UE 102*a* uploading data and file URL reference on which the MCData communication is to be released.

3. The MCData server 104 stops any ongoing data transfer and removes (606) the data already stored by the MCData server 104.

4. The MCData server sends (608) MCData communication release response back to the first MCData UE 102*a*. The MCData communication release response includes the identity of the MCData user of the first MCData UE 102*a* requesting to upload data and confirmation whether MCData communication is released or not.

5. If file uploading over HTTP is completed and the one or more second MCData UEs 102*b*-102*n* have received the file metadata, e.g., file URL, then the MCData server also sends (610) "data not available" control indication to the one or more second MCData UEs 102*b*-102*n* (i.e., all participants receiving file metadata). The data not available control indication includes the identity of the MCData user at second MCData UE(s) 102*b*-102*n* receiving file URL reference, Conversation Identifier and the URL reference of the file that is not available to download.

6. The first MCData UE 102*a* notifies (612) MCData user about MCData communication release or MCData communication termination.

FIG. 7 is a sequence diagram illustrating various signaling messages communicated between the first MCData client UE 102*a*, the MCData server 104, and the second MCData UE 102*b*, in which the MCData server initiates MCData communication release without prior indication and using media plane, wherein MCData communication is established as SDS using media plane or file distribution using media plane, according to an embodiment as disclosed herein. In the sequence diagram shown in the FIG. 7, the MCData server 104 initiates release of MCData communication termination without prior notification. In this scenario, the MCData server 104 transmits the communication release request message to the first MCData UE 102a and the second MCData UEs 102b and 102c.

The MCData server 104 initiates the release of ongoing MCData communication, since at least one of the communication release conditions are met such as for example, lack of bearer capacity, limit for the maximum amount of data or time that the first MCData UE 102a (i.e. the participant) transmits in response to the single request to transmit has exceeded. Based on the configuration or more policies, the MCData server 104 decides to pre-empt the MCData communication without prior notification to each of the MCData UEs.

The procedure in FIG. 7 describes signaling control plane procedure for the case where during ongoing MCData communication, based on communication release conditions, MCData server 104 initiates the communication release. The procedure is applicable to one-to-one and one-to-many communication.

The following are the pre-conditions for the release of the ongoing MCData communication.

1. The MCData users of the first MCData client UE 102a, the second MCData UE 102b and the second MCData UE 102c are registered for receiving MCData service.

2. A MCData Administrator has configured the one or more events such as limits for the maximum amount of data or time that the first MCData UE 102a transmits in response to a single request to transmit.

3. The MCData communication is established between the first MCData UE 102a, the second MCData UE 102b and the second MCData UE 102c. The first MCData UE 102a is the initiator of the MCData communication.

The various operations involved in release of the MCData communication are described below.

1. The MCData server 104 initiates (702) the release of the MCData communication identified by, e.g., the conversation identifier, since at least one of the release conditions are met, e.g., lack of capacity, limit for the maximum amount of data or time that a participant transmits in response to a single request to transmit exceeded. Based on this configuration, MCData server decides to pre-empt the MCData communication without giving prior indication to MCData UE 102a.

2. The MCData server 104 identifies (704) the participants of the ongoing MCData communication and generates MCData server communication release request to release the ongoing MCData communication. The MCData server communication release request includes identity of the MCData user of the MCData UE(s) 102a-102n to which communication is released, conversation identifier and reason for the release.

3. The MCData server 104 sends (706, 708 and 710) the MCData server communication release request to each participants of the MCData communication (i.e., the first MCData UE 102a, the second MCData UE 102b and the second MCData UE 102c respectively).

4. MCData users are notified (712, 714, and 716) about the release of the MCData communication by the MCData UEs 102a, 102b and 102c-.

5. The MCData UEs 102a, 102b and 102c respectively send (718, 720 and 722) the MCData server communication release response to the MCData server 104. The MCData server communication release response identity of second MCData UE 102b on which the communication is released and confirmation whether communication is released or not.

6. All participants of the MCData communication (i.e., the first MCData UE 102a, the second MCData UE 102b and the second MCData UE 102c) have successfully released (724) the media plane resources associated with the MCData communication that is released.

FIG. 8 is another sequence diagram illustrating various signaling messages communicated between the first MCData UE 102a, the MCData server 104, and the second MCData UE 102b in which the MCData server 104 initiates release of MCData communication without prior notification and using HTTP, according to an embodiment as disclosed herein The sequence diagram in FIG. 8 describes the procedure for the MCData server 104 initiated MCData communication release without prior indication to the first MCData UE 102a (i.e., the initiator MCData UE), where the MCData communication is established using procedure for file distribution using HTTP.

The procedure in FIG. 8 describes signaling control plane procedure for the case where during ongoing MCData communication, based on policies or communication transmission events such as limits set by MCData administrator, the MCData server 104 initiates the communication. The procedure is applicable for one-to-one and one-to-many communication.

The following are the pre-conditions for the release of the ongoing MCData communication.

1. The MCData users of the first MCData client UE 102a, the second MCData UE 102b and the second MCData UE 102c are registered for receiving MCData service.

2. A MCData Administrator has configured the one or more events such as limits for the maximum amount of data or time that the first MCData UE 102a (i.e., the participant) transmits in response to a single request to transmit.

3. The MCData communication is ongoing between the first MCData UE 102a, the second MCData UE 102b and the second MCData UE 102c. The first MCData UE 102a is the initiator of the MCData communication.

The various operation involved in release of MCData communication are described below.

1. The MCData server 104 initiates (802) the release of MCData communication identified by, e.g., the conversation identifier, since at least one of the release conditions are met, e.g., lack of capacity, limit for the maximum amount of data or time that a participant transmits in response to a single request to transmit exceeded. Based on this configuration, MCData server pre-empts the MCData communication without giving prior indication to first MCData UE 102a.

2. The MCData server 104 halts any ongoing data transfer and removes (804) the data stored by the MCData server 104.

3. The MCData server 104 sends (806) MCData server communication release indication message including reason for release to the first MCData UE 102a. The MCData server communication release indication includes the identity of the MCData user(s) of the MCData UE(s) 102a-102n to which communication is released, File URL reference on which the communication is to be released and reason for the release.

4. The MCData UEs 102a notifies (808) the respective MCData user about server initiated communication release.

5. If file uploading over HTTP is completed and one or more second MCData UEs (102b and 102c) have received the file metadata, e.g., file URL, then the MCData server 104 also sends (810 and 814) a "data not available" control indication to all the participants of the MCData communication (i.e., the second MCData UE 102b and the second MCData UE 102c). The data not available control indication includes the identity of the MCData user at second MCData UE(s) 102b-102n receiving file URL reference, Conversation Identifier and the URL reference of the file that is not available to download.

6. MCData users of MCData UEs 102b and 102c are notified about the release of the MCData communication.

FIG. 9 is a sequence diagram illustrating various signaling messages communicated between the first MCData UE 102a and the MCData server 104 in which the MCData server 104 initiates release of communication termination with prior notification to the first MCData UE 102a, according to an embodiment as disclosed herein. The FIG. 9 describes the procedure for MCData server 104 initiated MCData communication release with prior indication, where MCData communication is established as SDS using media plane or file distribution using media plane or file distribution using HTTP.

The procedure in FIG. 9 describes signalling control plane procedure for the case where during an ongoing MCData communication, based on communication release conditions, MCData server 104 initiates communication release. As a result of configuration check, MCData server notifies the intent to release MCData communication, optionally requesting for more information (e.g. to know the remaining data volume to transmit) from the MCData client initiating MCData communication.

The MCData server 104 initiates the release of the ongoing MCData communication based on the detected events such as lack of capacity, limit for the maximum amount of data or time that a participant MCData UE transmits in response to a single request to transmit has exceeded and so on. Based on one or more policies, the MCData server 104 decides to notify the first MCData UE 102a about server's intent to release the MCData communication. The notification of the intent of the MCData server 104 to the first MCData UE 102a allows the first MCData UE 102a to request for extension of the MCData communication. The following are the pre-conditions for the release of the ongoing MCData communication.

1. The MCData users on the first MCData client UE 102a, the second MCData UE 102b and the second MCData UE 102c are registered for receiving MCData service.

2 The MCData Administrator has configured the one or more events such as limits for the maximum amount of data or time that the first MCData UE 102a transmits in response to a single request to transmit.

3. MCData communication is ongoing between the first MCData UE 102a, the second MCData UE 102b and the second MCData UE 102c and the first MCData UE 102a is the initiator of the communication.

4. MCData administrator has configured the time for which MCData server 104 needs to wait for an extension request from the MCData UE 102a.

The various operations involved in release of MCData communication are described below.

1. The MCData server 104 initiates (902) the release of MCData communication identified by, e.g., the conversation identifier, since at least one of the release conditions are met, e.g., lack of capacity, limit for the maximum amount of data or time that a participant transmits in response to a single request to transmit exceeded. Based on this configuration, MCData server notifies the intent to release MCData communication.

2. The MCData server 104 sends (904) MCData release intent request to the first MCData client 102a. The MCData server 104 may include a request for more information in the release intent request, for example, to allow the first MCData UE 102a to indicate the remaining data volume to send (if known to the first MCData UE 102a). The MCData release intent request includes identity of the MCData UE 102a, who is the originator of the communication, conversation identifier, indication that MCData server 104 needs more information (e.g., to know the remaining data volume to transmit) about the communication which has been identified to be released and reason for release.

3. MCData UE 102a notifies (906) MCData user about the intent to release communication.

4. If a request for more information is included in the received MCData release intent request, then the first MCData client 102a sends (908) a MCData more information response back to the MCData server 104 including the remaining amount of data to transmit. Upon receiving MCData more information response from the first MCData UE 102a, the MCData server 104 waits MCData request for extension until the time configured by the MCData administrator. If the MCData server 104 does not receive a MCData request for extension within the configured timeout, the MCData server 104 terminates the MCData communication. The MCData more information response includes an identity of the MCData user, who is originator of communication, conversation identifier and more information as requested by MCData server 104.

5. If the MCData user at the first MCData UE 102a decides (910) to request for the extent of the communication.

6. The first MCData UE 102a sends (912) MCData request for extension of the MCData communication. The MCData request for extension includes conversation identifier to identify communication for which extension is requested.

7. Upon receiving a request for extension of MCData communication from the first MCData UE 102a, the MCData server 104 asserts (914) policies to decide whether to accept or reject the request for extension from the first MCData UE 102a.

6. The MCData server 104 sends (916) MCData response for extension to the first MCData UE 102a. The MCData response for extension includes conversation identifier and response for the extension indicating whether request for extension has been accepted or not.

According to an exemplary embodiment, the MCData communication continues if the MCData server 104 decides to accept the request for extension from the first MCData UE 102a. The MCData communication is released if the MCData server 104 decides to reject the request for extension from the first MCData UE 102a.

FIG. 10 is a sequence diagram illustrating various signaling messages in which authorized MCData UE 102d initiates release of communication without prior notification to the first MCData UE 102a, according to an embodiment as disclosed herein. An authorized MCData user at MCData UE 102d at any time during an on-going MCData communication decides to release communication. The authorized user may decide to release MCData communication without prior indication to the first MCData UE 102a initiator MCData client. According to an exemplary embodiment, the authorized MCData user may or may not be part of the MCData communication.

The procedure in FIG. 10 describes signalling control plane procedure for the case where during an ongoing MCData communication, authorized MCData user 102d initiates MCData communication release without prior indication to the first MCData UE 102a initiator MCData client. An authorized MCData user is part of the on-going MCData communication. The following are the pre-conditions for the release of the ongoing MCData communication.

1. An authorized MCData user of the MCData UE 102d is already registered for receiving MCData service.

2 A MCData communication is ongoing between MCData UE(s) 102a-102n and authorized MCData user is keeping track of which MCData UE(s) (i.e., participants) are receiving communication, e.g., through "message delivered" and/or "message read" indications for the MCData communication.

The various operations involved in release of MCData communication are described below 1. The authorized MCData user of MCData UE 102d requests (1002) to release ongoing MCData communication without prior indication to initiator of MCData communication, i.e., the first MCData UE 102a.

2. The authorized MCData UE 102d sends (1004) MCData auth user communication release request to the MCData server 104 identifying the MCData communication to release The MCData auth user communication release request also includes information for the MCData server 104 to release the MCData communication without prior indication to the first MCData UE 102a. The MCData auth user communication release request includes a conversation identifier to identify communication to be released, and indication for MCData server 104 to release MCData communication without prior indication 3. Upon receiving MCData auth user communication release request to release the MCData communication, the MCData server 104 validates (1006) the authorized MCData UE from which the MCData auth user communication release request is received. The MCData server 104 determines whether the MCData user at MCData UE 102d is allowed to release the communication or not.

4. After validation, if the MCData user at MCData UE 102d is authorized to release the MCData communication, then the MCData server 104 releases (1008) the MCData communication.

5. After release of the MCData communication, the MCData server 104 sends (1010) MCData auth user communication release response to the authorized MCData UE 102d. The MCData auth user communication release response includes conversation identifier to identify MCData communication which is released and confirmation whether MCData communication is released or not.

FIG. 11 is a sequence diagram illustrating various signaling messages in which the authorized MCData UE 102d initiates release of MCData communication with prior notification to the first MCData UE 102a, according to an embodiment as disclosed herein. An authorized MCData user at MCData UE 102d at any time during an ongoing MCData communication decides to release MCData communication. The authorized user may decide to release MCData communication with prior indication to the first MCData UE 102a (i.e. initiator MCData UE). A prior indication allows first MCData UE 102a (i.e. initiator MCData UE) to request for extension for the MCData communication. It should be noted that the authorized MCData user may or may not be part of the MCData communication.

The procedure in FIG. 11 describes signalling control plane procedure for the case where during an ongoing MCData communication, authorized MCData user at MCData UE 102d initiates MCData communication release with prior indication to the first MCData UE 102a (i.e., the initiator MCData UE). Authorized MCData user is part of the ongoing MCData communication. The first MCData UE 102a decides to request an extension of the ongoing communication. The following are the pre-conditions for the release of the ongoing MCData communication.

1. The authorized MCData user of the MCData UE 102d is registered for receiving MCData service.

2. The MCData communication is ongoing between the second MCData UEs 102b-102n and first MCData UE 102a is the initiator of the MCData communication. The and authorized MCData user of the MCData UE 102d is keeping track of which MCData UE(s) 102b-102n are receiving communication, e.g., through "message delivered" and/or "message read" indications for the MCData communication.

The various operations involved in release of on-going MCData communication are described below.

1. The authorized MCData user of the MCData UE 102d requests (1102) to release the MCData communication by providing prior notification to the first MCData UE 102a (i.e., the initiator of MCData communication).

2. The authorized MCData UE 102d sends (1104) MCData auth user communication release request including a communication identifier to uniquely identify the MCData communication to the MCData server 104. The authorized MCData client may include a request for more information in the MCData auth user communication release request, for example, to allow the first MCData UE 102a to indicate the remaining data volume to send (if known to the first MCData UE 102a). The MCData auth user communication release request also includes information for the MCData server 104 to release the MCData communication with prior notification to the first MCData UE 102a. The MCData auth user communication release request includes conversation identifier to identify communication to be released, indication that authorized MCData user at MCData UE 102d needs more information about the communication which has been identified to be released and indication for MCData server 104 to release MCData communication without prior indication.

3. Upon receiving the MCData auth user communication release request to release the MCData communication, the MCData server 104 validates (1106) the second MCData UE 102d user from which communication release request received. The MCData server 104 determines whether the second MCData UE 102d is allowed to release communication.

4. After validation, if the second MCData UE 102d is authorized to terminate MCData communication, the MCData server 104 sends (1108) the MCData release intent request message including a reason for the release of MCData communication. The MCData server 104 may include request for more information in the release intent request message if the authorized MCData client 102d requests for more information. The MCData release intent request includes an identity of the MCData UE 102a, who is the originator of the communication, conversation identifier, indication that MCData user at MCData UE 102d needs more information (e.g., to know the remaining data volume to transmit) about the communication which has been identified to be released and reason for release.

5. MCData UE 102a informs (1110) MCData user about the intent to release communication by the authorized MCData user of the MCData UE 102d.

6. Upon receiving the MCData release intent request from the MCData server 104 about intent to release the MCData communication, if the request for more information is included, then the first MCData UE 102*a* sends (1112) MCData more information response to the MCData server 104 and indicates the remaining amount of data to be transmitted. The MCData more information response includes an identity of the MCData user who is the originator of communication, conversation identifier and more information as requested by authorized MCData user at MCData UE 102*d*.

7. After receiving a response from the first MCData UE 102*a*, the MCData server 104 forwards (1114) MCData more information response to the authorized MCData UE 102*d* and wait for the MCData request for extension until the time configured by the MCData administrator. If MCData server 104 does not receive MCData request for extension from first MCData UE 102*a* within the configured timeout, the MCData server 104 releases MCData communication.

8. The MCData user at first MCData UE 102*a* request (1116) the extension of the MCData communication.

9. The first MCData UE 102*a* sends (1118) MCData request for extension towards the MCData server 104. The MCData server 104 sends (1120) the request for extension to the authorized MCData UE 102*d*. The MCData request for extension includes conversation identifier to identify communication for which extension is requested.

10. Upon receiving MCData request for extension from the MCData server 104, the authorized MCData UE 102*d* notifies (1122) the authorized MCData user. The authorized MCData user decides to accept or reject the request for extension.

11. The authorized MCData UE sends (1124) a MCData response for extension to the MCData server 104. The MCData server 104 sends (1126) a response to the first MCData UE 102*a*. The MCData communication continues if the authorized MCData UE 102*d* decides to accept the request for extension from the first MCData UE 102*a*. The MCData server releases (1128) the MCData communication if the authorized MCData UE 102*d* decides to reject request for extension from the first MCData UE 102*a*. The MCData response for extension includes a conversation identifier and a response for extension indicating whether the request for extension has been accepted or not.

11. After MCData communication is released, the MCData server 104 sends (1130) the MCData auth user communication release response to the authorized MCData UE 102*d*. The MCData auth user communication release response includes a conversation identifier to identify MCData communication which is released and confirmation whether MCData communication is released or not.

The embodiments disclosed herein may be implemented using at least one software program running on at least one hardware device and performing network management functions to control the elements.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

The invention claimed is:

1. A method for releasing mission critical data (MCData) communication among a first MCData user equipment (UE), a second MC data UE and an MCData server, the method comprising:
    determining, by the MCData server, whether to release an MCData communication, based on a release condition;
    transmitting, by the MCData server, an MCData release intent request including a request for more information to the first MCData UE;
    receiving, by the MCData server, an MCData more information response from the first MCData UE, in response to the MCData release intent request message including the request for more information;
    determining, by the MCData server, whether an MCData request for extension is received within a predetermined time from the first MCData UE, upon receiving the MCData more information response;
    determining, by the MCData server, whether to accept the MCData request for extension based on one or more policies, in response to receiving the MCData request for extension;
    transmitting, by the MCData server, an MCData response message based on the determination on whether to accept the MCData request for extension to the first MCData UE; and
    releasing the MCData communication when the MCData server did not accept the MCData request for extension.

2. The method of claim 1, wherein the releasing of the MCData communication further comprises:
    transmitting an MCData server communication release request to the first MCData UE and the second MCData UE; and
    receiving an MCData server communication release response from the first MCData UE and the second MCData UE.

3. The method of claim 1, wherein the releasing of the MCData communication further comprises:
    removing file data stored by the MC Data server.

4. The method of claim 3, further comprising:
    transmitting an MCData server communication release indication to the first MCdata UE.

5. The method of claim 1, wherein the MCData request for extension includes an identifier indicating a communication for which the extension is requested.

6. A method for releasing mission critical data (MCData) communication among a first MCData user equipment (UE), a second MCData UE and an MCData server, the method comprising:
    receiving an MCData release intent request from the MCData Server;
    determining whether the MCData release intent request includes a request for more information;
    transmitting a MCData more information response to the MCData server, when the request for more information is included in the MCData release intent request;
    transmitting an MCData request for extension to the MCData server based on the determination; and
    receiving an MCData response for extension from the MCData server or receiving an MCData server communication release indication from the MCData server.

7. The method of claim 6, further comprising:
    receiving an MCData server communication release request from the MCData server; and
    transmitting an MCData server communication release response to the MCData server.

8. A mission critical data (MCData) server for releasing MCData communication among a first MCData user equipment (UE), a second MCData UE, and an MCData server, the MCData server comprising:
a transceiver; and
a processor coupled with the transceiver and configured to:
determine whether to release an MCData communication, based on a release condition,
transmit an MCData release intent request including a request for more information to the first MCData UE,
receive an MCData more information response from the first MCData UE, in response to the MCData release intent request message including the request for more information,
determine whether an MCData request for extension is received within a predetermined time from the first MCData UE, upon receiving the MCData more information response,
determine whether to accept the MCData request for extension based on one or more policies, in response to receiving the MCData request for extension,
transmit an MCData response message based on the determination on whether to accept the MCData request for extension to the first MCData UE, and
release the MCData communication when the MCData server did not accept the MCData request for extension.

9. The MCData server of claim 8, wherein the processor is further configured to:
transmit an MCData server communication release request to the first MCData UE and the second MCData UE, and
receive an MCData server communication release response from the first MCData UE and the second MCData UE.

10. The MCData server of claim 8, wherein the processor is further configured to:
remove file data stored by the MC Data server, and
transmit an MCData server communication release indication to the first MCData UE.

11. A first mission critical (MCData) user equipment (UE) for releasing MCData communication among a first MCData UE, a second MCData UE, and an MCData server, the first MCData UE comprising:
a transceiver; and
a processor coupled with the transceiver and configured to:
receive an MCData release intent request from the MCData Server,
determine whether the MCData release intent request includes a request for more information,
transmit a MCData more information response to the MCData server, when the request for more information is included in the the MCData release intent request,
transmit an MCData request for extension to the MCData server based on the determination,
receive an MCData response for extension from the MCData server or receive an MCData server communication release indication from the MCData server.

* * * * *